United States Patent [19]

Aigeldinger

[11] Patent Number: 5,125,168
[45] Date of Patent: Jun. 30, 1992

[54] APPARATUS FOR PROCESSING A PASTY PRODUCT IN A VACUUM

[75] Inventor: Jean-Claude Aigeldinger, Wittnau, Switzerland

[73] Assignee: Zwag Zschokke Wartmann AG, Dottingen, Switzerland

[21] Appl. No.: 547,499

[22] Filed: Jul. 2, 1990

[30] Foreign Application Priority Data

Jul. 3, 1989 [CH] Switzerland .............. 2464/89

[51] Int. Cl.⁵ ........................... F26B 17/00
[52] U.S. Cl. ........................ 34/92; 426/448; 426/473
[58] Field of Search .......... 425/203, 812; 34/92, 34/15; 426/473, 448

[56] References Cited

U.S. PATENT DOCUMENTS 3,612,411 10/1971 Oetjen et al. ................. 34/92
4,251,558 2/1981 Kobayashi et al. ........... 426/473
4,574,495 3/1986 Brander ....................... 34/92

*Primary Examiner*—George Yeung
*Attorney, Agent, or Firm*—Fay, Sharpe, Beall, Fagan, Minnich & McKee

[57] ABSTRACT

In order to dry continuously a pasty product being processed in a wet condition the product is fed via an extruder into a vacuum zone, which e.g. can be formed by a vacuum band drier. The heating of the product occurring due to the extrusion leads to a rapid expansion and drying in the vacuum. An additional feeding of heat is depending on the product no longer necessary. Accordingly the dwell time of the product in the vacuum can be reduced such that the productivity can be increased. Furthermore it is possible to operate at lower temperatures such that the quality of the product is not detrimentally influenced.

11 Claims, 4 Drawing Sheets

APPARATUS FOR PROCESSING A PASTY PRODUCT IN A VACUUM

BACKGROUND OF THE INVENTION

1. Field of the Invention

The present invention relates to a method of a continuous processing of a pasty product. It relates further to an apparatus for practicing such method.

2. Description of the Prior Art

Specifically in the foodstuffs producing field it is generally known to process components in a wet state and to condition same. If the product must be transformed finally into a dry state such as is the case e.g. for powder for breakfast beverages, for baked goods to be eaten with drinks, for powders to produce soups etc., the product must be dried prior to the packaging thereof. It is known to, therefore, convey the product in a still pumpable state, i.e. with a water content of 15–20%, into a vacuum band drier and to remove the wetness from the product therein by a heating thereof. The product is conveyed on a conveyor band continuously through the vacuum chamber and is thereby heated by a contact or radiation heating. For a sufficient extraction of water a relative long dwell time in the vacuum is necessary, specifically in case of products which expand during the extraction of water in the vacuum. This leads to a relative low yield of the production of the corresponding vacuum band driers. Furthermore, the total weight of the drier with the product is relatively high, which is detrimental specifically in connection with the gravity force-air lock outlet for the product because the drier must be located at an elevated level.

Representative disclosed known methods of vacuum band drying are illustrated e.g. in the U.S. Pat. Nos. 4 574 495 and 4 640 020.

SUMMARY OF THE INVENTION

It is, therefore, a general object of the present invention to provide a method and an apparatus, by means of which the dwell time in the vacuum band drier can be decreased, preferably also at a decrease of the treatment temperature such that conclusively either the production output may be increased or the size of the apparatus decreased.

A further object of the invention is to provide a method of a continuous processing of a pasty product which comprises the step of feeding the product at a heating thereof by an extruder into a vacuum zone, whereby the product is at least partly solidified in the vacuum zone by a utilization of the heat brought forth in the extruder. Yet a further object of the present invention is to provide an apparatus for a continuous processing of a pasty product, which apparatus includes an extruder suitable for a handling of the product and having an exit nozzle in communication with an evacuatable chamber and comprising a means for conveying the extruded product, which conveying means is mounted in the evacuatable chamber.

It has surprisingly been found that mentioned objects can be met when the product upon being heated in an extruder is fed into a vacuum zone. The latent heat is transmitted to the product to be processed by the extruder in a sufficient amount prior to the vacuum treatment such to obtain thereafter in the vacuum the sought effect (e.g. drying, expanding of the product, melting, cooling etc.) without or with a distinctly lower influence of heat. Because the product has been heated by the extruder already prior to its entering into the vacuum, an earlier and larger expansion occurs at expanding products, which accelerates the drying. Furthermore, a saving regarding the dwell time in the vacuum is arrived at, which saving would correspond to the time span of heating the product in the vacuum. Conclusively it is possible to operate the vacuum band drier also at lower temperatures which often times influences positively the properties of the product (taste, solubility).

BRIEF DESCRIPTION OF THE DRAWINGS

The present invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
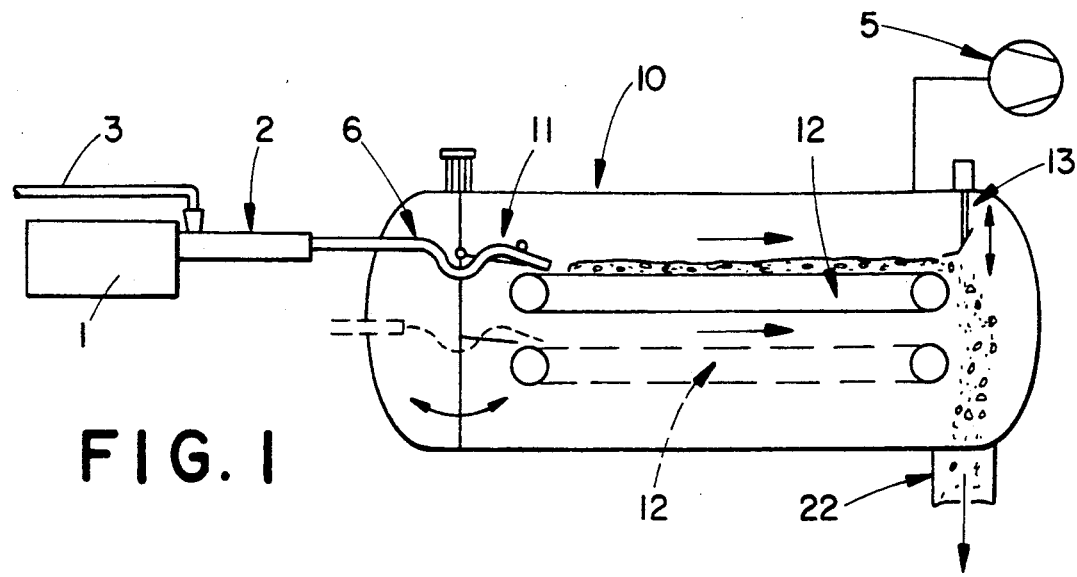
FIG. 1 is a schematic illustration of a first embodiment of the invention.

FIG. 1 illustrates on a schematic basis only an extruder 1 of a as such known design such as known for applications such as mixing, homogenizing, dispersing, etc. of materials. Such an extruder is e.g. of the type ZSK 30 of the company Werner & Pfleiderer or a similar corresponding machine of other manufacturers. The extruder 1 includes a screw (i.e. twin screw) 2, by means of which the product is conveyed, which product is fed to the extruder via feed lines 3. By means of this kind of conveying the product can, from the beginning, be processed at a substantially lower water content of e.g. 4 to 6%. During the flowing through the screw 2 of the extruder the product is heated by the mechanical working thereof such that it exits at the end of the screw and flows under pressure out of a (not specifically illustrated) nozzle. The design of this nozzle sets depending on a given material to be processed the shape of the strand exiting thereof, which strand exits directly into an evacuated zone. This evacuated zone may be such as specifically illustrated in the embodiments of FIGS. 1 to 3 a vacuum band drier 10.

Such vacuum band driers are also of a generally known design and may be obtained e.g. from the applicant of the present invention. In order to vacuum treat the product such vacuum band driers include a vacuum pump 5 and selected devices for an additional thermal acting from the outside onto the product by means of a heating or a cooling, respectively, by contact heating surfaces, by microwave heating or a convection heating (not illustrated). However, in the present embodiment the extruder 1 will add in most cases a large enough amount of latent heat to the product in order to achieve the desired effects in the subsequently following vacuum (such as e.g. drying, expanding, cooling of the glaze etc.) such that the time consuming heating from the outside can be done away with in the vacuum or at least can be reduced considerably.

The simplest embodiment of the invention includes such as illustrated in FIG. 1 an extruder 1, of which the extrudate exits via a transfer line 6 into the vacuum in a vacuum band drier 10 of generally known design. This vacuum band drier comprises a pivot apparatus for charging a conveyor band 12 in a swivelling manner, by means of which apparatus 11 the extruded strand is distributed or placed, respectively, in a meandering shape onto the conveyor band. Immediately at the exit into the vacuum the product expands under the influence of the increased temperature proper of the product and the low atmosphere whereby the water content evaporates immediately, too. The drying and cooling can accordingly be made at certain products without any additional adding of heat or chilling, respectively, from the outside in the vacuum band drier. Corresponding to the short dwell time the conveyor band 12 can be operated at a higher speed. At the end of the conveyor band 12 the product which at this location is still an uninterrupted strand can be removed by a breaking device 13, be accordingly broken and finally removed downwards through an air lock. Such as indicated in FIG. 1 it is also possible to have a plurality of parallel operating conveyor bands 12.

Figure 2:
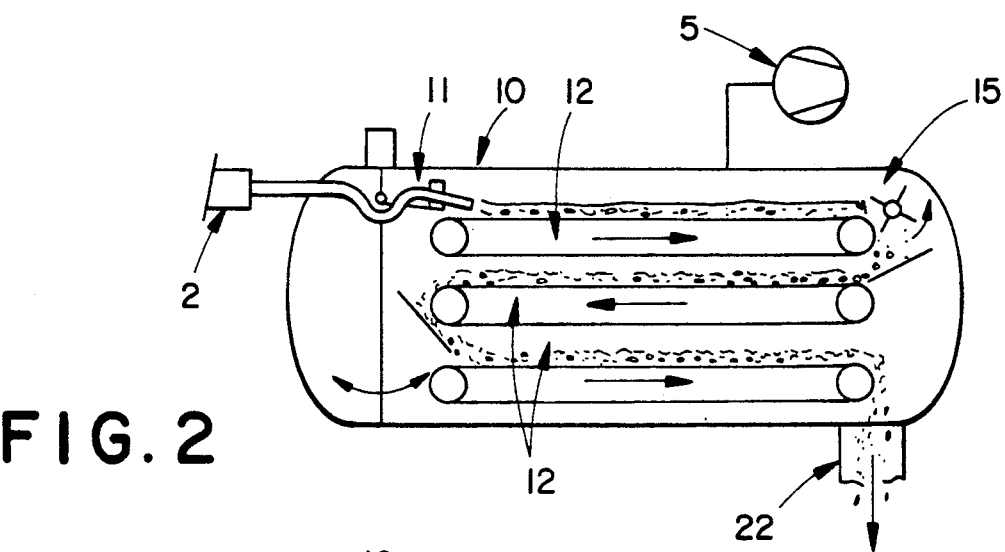
FIG. 2 is a possible modification of the embodiment illustrated in FIG. 1.

According to a modification illustrated in FIG. 2 it can be foreseen to comminute the dried product at the end of the first conveyor band 12 in a granulating device 15 such that it falls as a fluid product onto a band 12 located thereunder, etc. The number of bands 12 which in contrast to FIG. 1 move alternatively backwards and forwards depends on the total dwell time of the product as well as on the quantity to be produced in the vacuum band drier. Because the product is sufficiently dried already after a short dwell time, it can be granulated in the embodiment described after one band length such that the drying effect can be increased once more due to the now obviously increased surface of the product. Specifically in a granulated state of the product it is possible to effect if necessary an additional heating from the outside.

Figure 3:
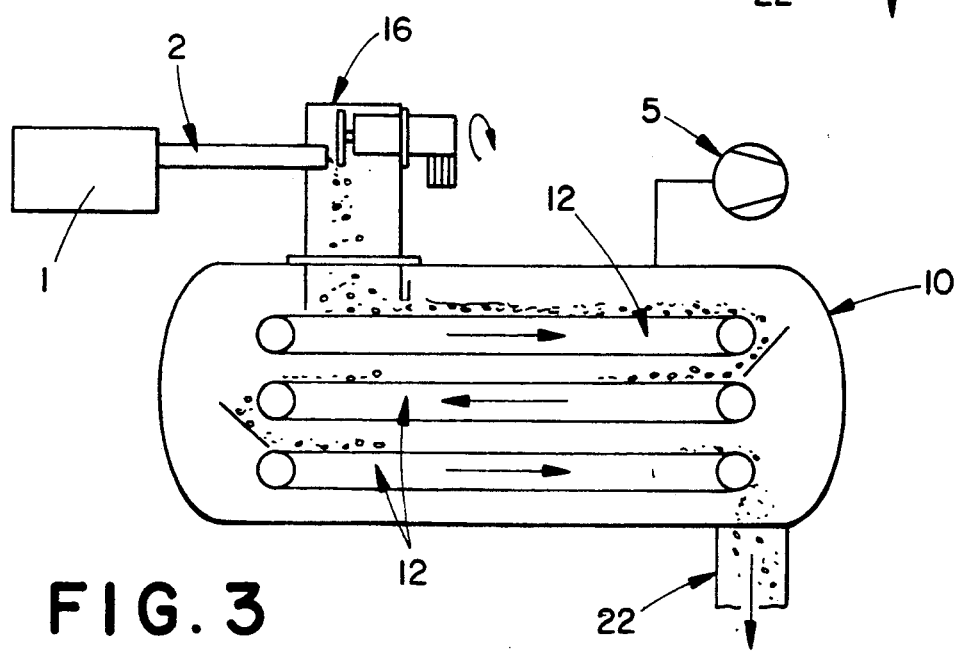
FIG. 3 is a schematic illustration of a second embodiment of the invention.

As already mentioned, one advantage of the inventive method is that the product expands already shortly after the exiting out of the extruder and that it dries rapidly at its surface. The extrudate adheres shortly after the exiting out of the extruder no longer at its surface and may be cut. Accordingly it is now possible to granulate the extruded product under vacuum immediately after the exiting out of the extruder or after the completed expansion in a special nozzle (FIGS. 4, 5), which will be disclosed further below, to smaller particles of a size from 1 mm to 150 mm. This treatment allows specifically a shortening of the dwell time. FIG. 3 illustrates such a design. Here the extrudate is granulated directly at the exit of the extruder under vacuum by means of a rotating knife 16 before it falls onto the conveyor band 12. Because due to the reasons explained above the individual pieces of the granulate do no longer adhere at each other, it can move without any further mechanical treatment along one or a plurality of conveyor bands 12 in the vacuum band drier 10. In this already initially granulated state the drying proceeds correspondingly with a higher effect or at an application of lower temperatures, respectively.

Figure 4:
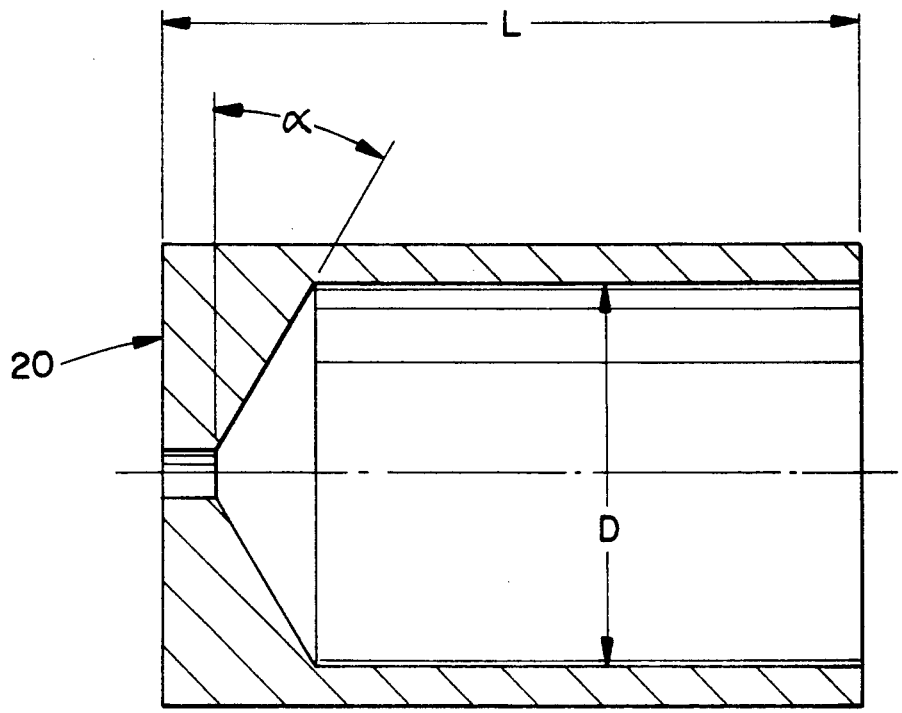
FIGS. 4 and 5 show a sectional view of special nozzles of a granulating device according to FIG. 3.
Figure 5:
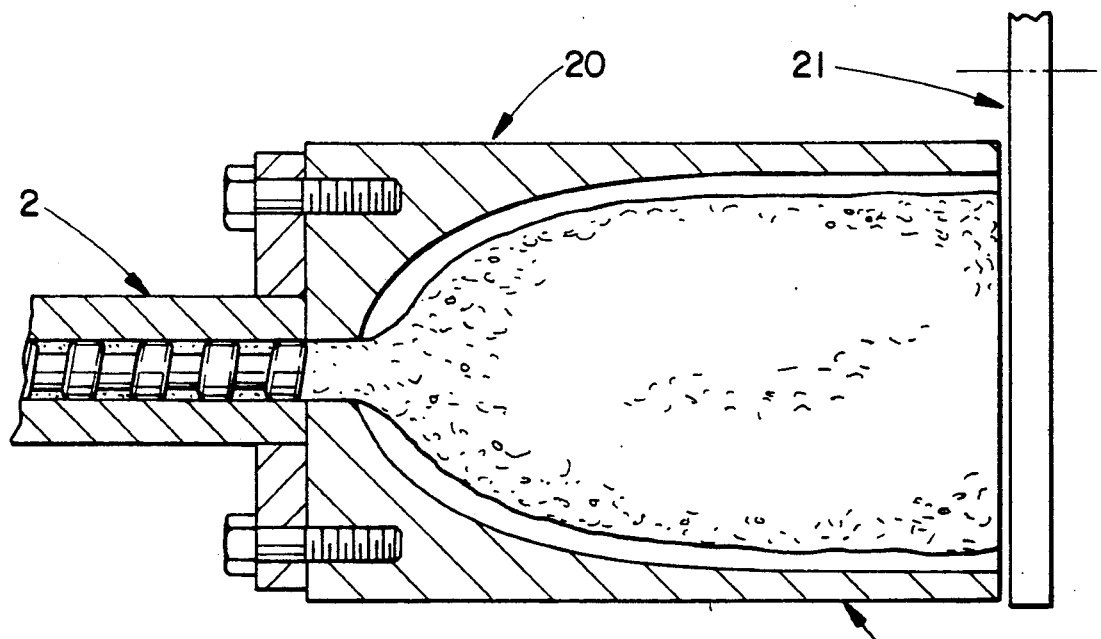

FIGS. 4 and 5 illustrate in sectional view through the above mentioned special nozzles which allow a cutting of the product after the expansion in the vacuum. For certain, strongly expanding products a nozzle or expansion chamber 20, respectively, can be arranged after the extruder part 2 proper, which nozzle or expansion chamber 20, respectively, allows an expanding of the product before it is cut or granulated. The nozzle 20 must be made to suit the expansion profile of the prevailing product and may be designed with an opening angle in the range of 0° to 50° and a length L in the range of about 20 to 500 mm as well as a diameter D in the range of about 10 to 200 mm (FIG. 4). Immediately at the end of the nozzle 10 a cutter device 21 is located, by means of which one layer of the product is severed per one revolution of the cutter. The relation between speed of feeding of the expanded strand and speed of rotation of the cutter knife 21 determines the thickness of the severed parts. The profile shape of the strand is determined by the shape of the exit opening of the extruder part 2. By means of this nozzle it is possible to give to the individual parts, e.g. for the production of so-called snacks, certain shapes. The distance, through which the products fall from the cutter device down to the transport band, is as a rule due to the already present latent heat in the product sufficient to dry the individual pieces also at the cut surface such that they are form stable and do not adhere to each other.

In order to remove the dried product out of vacuum band driers generally a gravity force-air lock outlet device 22, which possibly has a pneumatic transporting action, is used, which device is only schematically designed in the figures. Such air lock outlet devices 22 demand an elevated position of the vacuum band drier relative to the floor, which follows in turn into a corresponding elevated location of the extruder. Because the machine weight of the extruder is considerably high, a locating thereof at an elevated level leads to high expenditures.

Figure 6:
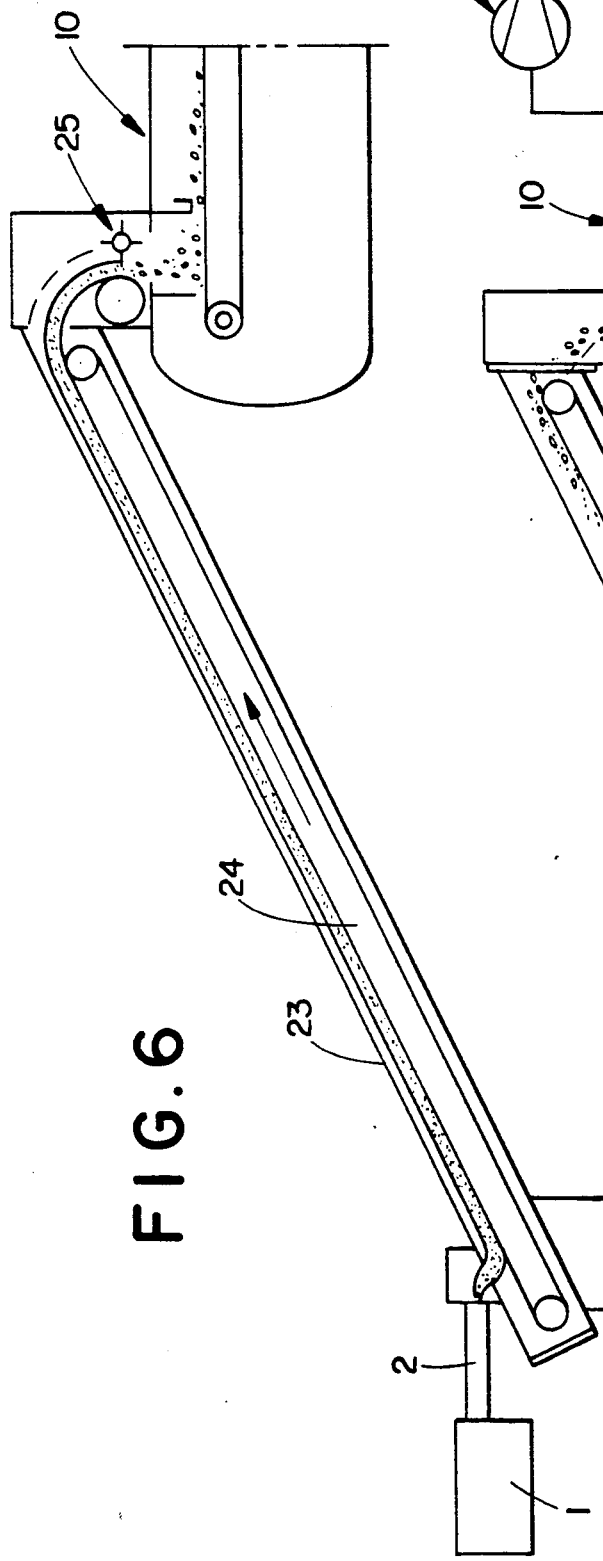
FIGS. 6 and 7 are schematic illustrations having a transport belt for bridging the level difference prevailing between extruder and vacuum band drier.
Figure 7:
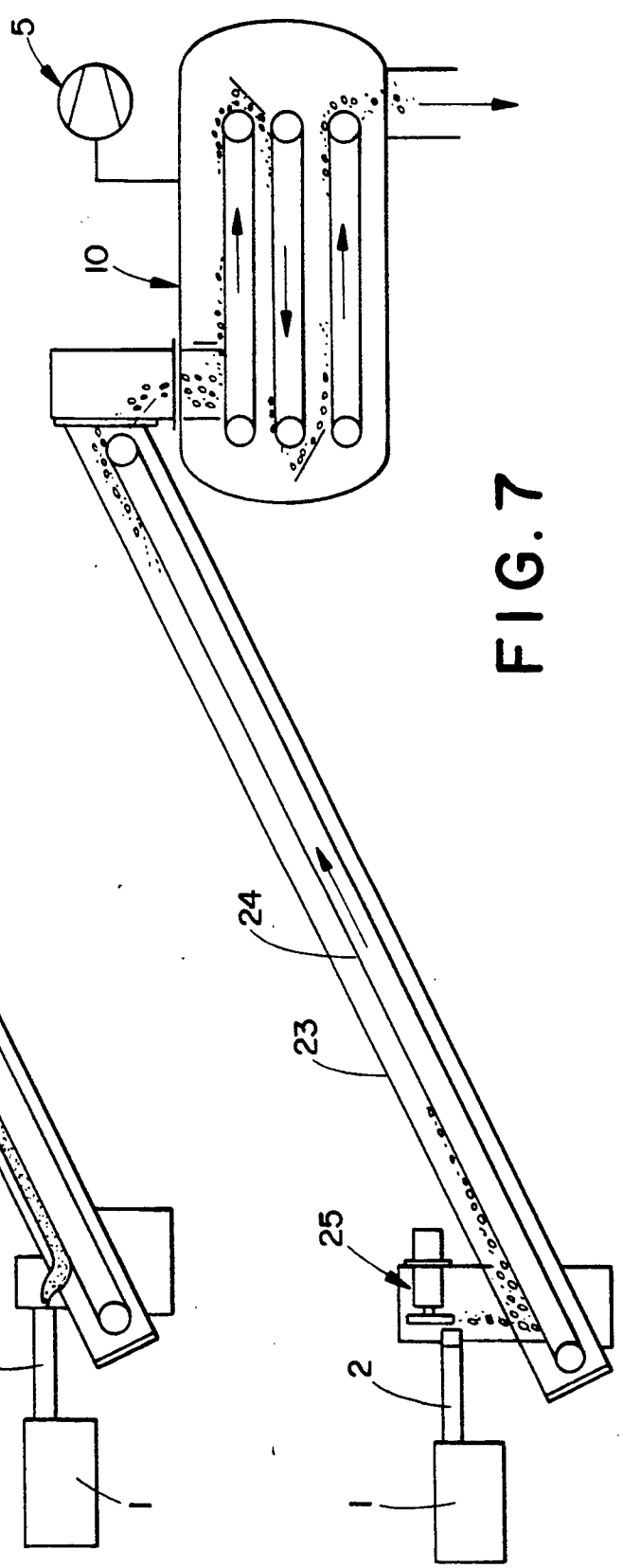

Accordingly, it is possible to foresee in accordance with FIGS. 6 and 7 a feed conveyor band 24 in an evacuated pipe 23 between extruder 1 and vacuum band drier 10, which feed conveyor band 24 transports the extruded product up to a higher level. According to a first variant (FIG. 6) the strand shaped product exiting out of the extruder is placed onto the feeding conveyor band 22. The speed of this band corresponds thereby to the speed of the extrudation. Along the path to the vacuum band drier the product expands and dries to such an extent that it can be granulated by means of a granulating device 25 at the inlet of the vacuum band drier 10. The dwell tie in the vacuum band drier 10 is reduced considerably. For faster drying products the granulating device 25 may in accordance with FIG. 7 be located directly at the extruder 1 such as described further above. The granulate is fed to the vacuum band drier 10 by means of the feed conveyor band 24. Because the drying in a vacuum and additionally under the influence of the elevated temperature of the product proper begins already at the feeding path 23, 24, the dwell time in the vacuum band drier 10 is shortened correspondingly. In place of the vacuum band drier foreseen in FIG. 77 a different type of drier such as e.g. a blade, spiral or screw type drier can be made use of, because the granulate is sufficiently dried and form stable at its surface after the feeding path such that it can be treated further as bulk material.

Figure 8:
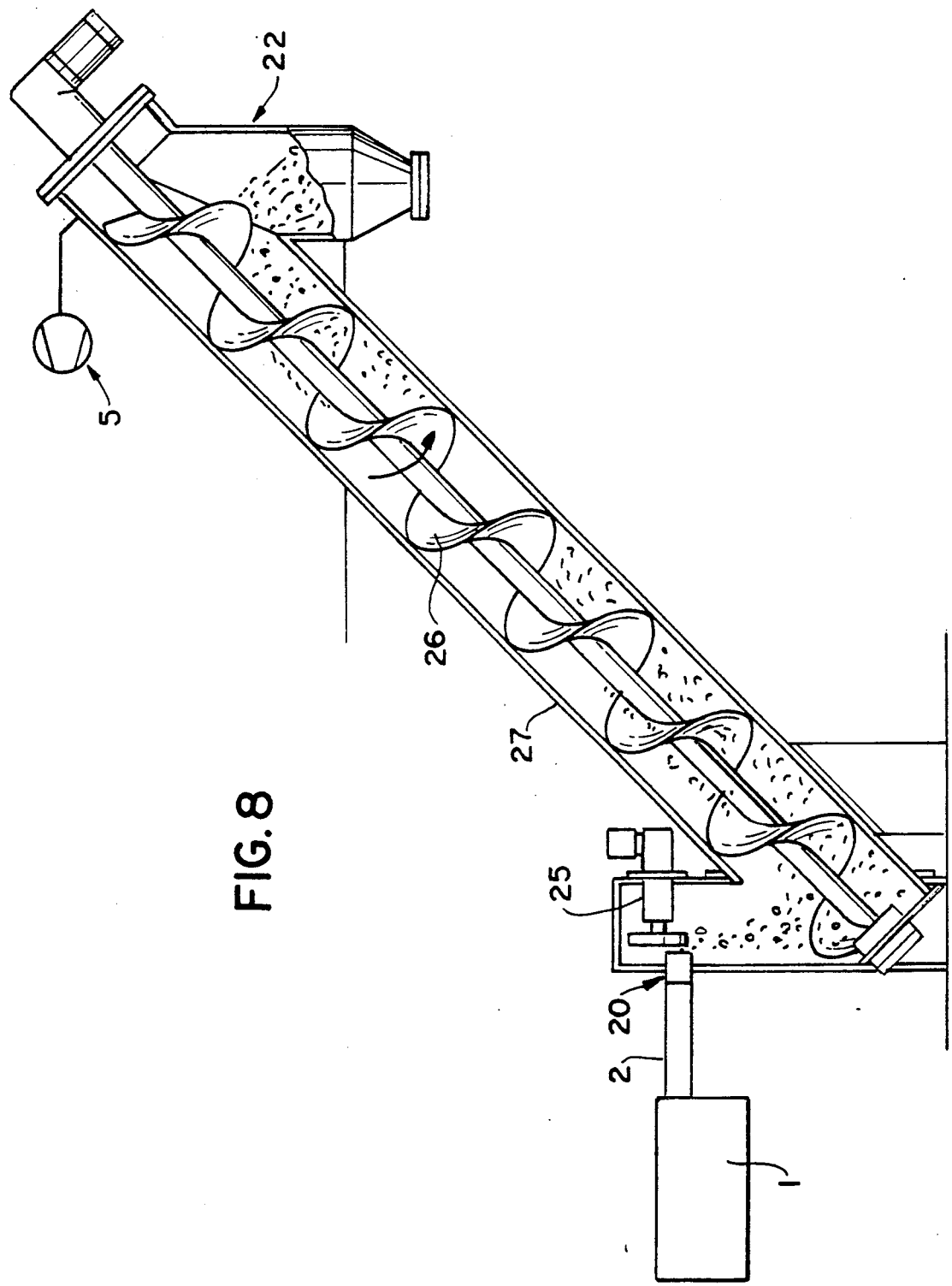
FIG. 8 is a schematic view of a third embodiment of the invention.

Finally FIG. 8 illustrates a device, by means of which the granulate is fed from the extruder into a vacuum drier which is not designed as vacuum band drier. The transport path to the air lock outlet device is designed as worm shaft 26 in a vacuum pipe 27. In place of the worm shaft it is also possible to use a spiral shaft or a paddle shaft of the kind used in a paddle drier. The pipe 27 can be located in a desired elevating angle between 0° (horizontally) and 90°, i.e. vertically. Due to the rapid drying at the surface immediately after the extruding or granulating, respectively, due to the influence of the heat proper and of the vacuum, the individual parts of the granulate do not adhere on each other and can be completely dried along the path of transport, possibly under influence of additional heat added from the outside and thereafter can exit through the air lock. In comparison with a use of a band drier this embodiment has the advantage that no distribution of the product on a band is needed such that no bands and no band control apparatus is necessary, that the volume of the drier can be utilized to a higher extent which leads to a lighter design thereof and that finally also strippers and breaking or crushing, respectively, apparatuses at the band are no longer necessary.

It is now obvious from the above disclosed embodiments that due to the inventive measures the productivity may be considerably increased by utilizing of the latent heat in the product. Until now the feeding of heat from the outside into the drier demanded long dwell times and this dwell time can now be reduced. Furthermore, it is possible to operate at lower temperatures. This leads specifically in case of foodstuffs to an improvement of the quality in that any kind of burned flavor can be avoided and the solubility of a final product is not reduced due to an influence of high temperature. Furthermore, the conveying of the product by means of an extruder allows from the outset a lower water content of the product which again leads to a reduction of the dwell time in the vacuum.

While there are shown and described present preferred embodiments of the invention, it is to be distinctly understood that the invention is not limited thereto, but may otherwise variously embodied and practiced within the scope of the following claims.

I claim:

1. An apparatus for continuously processing a pasty product comprising:
    an extruder for feeding a strip of the product;
    an expansion chamber for expanding the strip of product to its maximum diameter;
    an evacuatable chamber, said expansion chamber having an exit nozzle in communication with said evacuatable chamber;
    a comminuting unit for cutting the expanded strip of product into a cut product; and,
    a means for conveying the cut product, said means for conveying being mounted in said evacuatable chamber.

2. The apparatus of claim 1, wherein said evacuatable chamber and said product conveying means are formed by a vacuum band drier.

3. The apparatus of claim 2, wherein said vacuum band drier includes a gravity-dried goods air lock outlet device, in which said extruder is located at a lower level than said vacuum band drier, and in which a conveying channel is located between said extruder at said vacuum band drier, which conveying channel bridges the level difference, which conveying channel is mounted at its inlet end to the exit nozzle of said extruder and at its outlet end to said vacuum band drier and is part of said evacuatable chamber.

4. The apparatus of claim 1 wherein the cut product is transportable by means of a rotating conveyor member located in an evacuatable conveyor tunnel to a dry goods air lock outlet device.

5. The apparatus of claim 1 wherein an inlet end of said expansion chamber has a smaller diameter than an outlet end of said expansion chamber.

6. The apparatus of claim 1 wherein said comminuting unit is located in said evacuatable chamber.

7. The apparatus of claim 1 wherein an outlet end of said expansion chamber is located at a distance from said means for conveying so as to allow an outer periphery of the cut product to dry before contacting said means for conveying.

8. An apparatus for processing of a pasty product, comprising:
    an extruder for feeding a strip of said pasty product;
    a cutting means for cutting said strip into pieces;
    an evacuatable chamber for drying said pieces of the pasty product;
    an expansion chamber, said extruder having an exit nozzle connected to an inlet end of said expansion chamber, said expansion chamber having an outlet end open to said evacuatable chamber, said expansion chamber having a length to allow said strip of pasty product from said extruder to fully expand under vacuum substantially to its maximum dimension, and said cutting means comprising a cutting tool arranged at the outlet end of said expansion chamber to cut said fully expanded strip into pieces; and,
    a conveying means for conveying said pieces through the evacuatable chamber.

9. The apparatus of claim 8 wherein said inlet end of said expansion chamber has a smaller diameter than said outlet end, and wherein said expansion chamber has inner walls substantially corresponding to an expansion profile of said strip over its length.

10. The apparatus of claim 8 wherein said cutting tool is arranged to cooperate with said outlet end of the expansion chamber for shearing off pieces of said expanded strip protruding from said outlet end of the expansion chamber.

11. The apparatus of claim 8 wherein said outlet end of said expansion chamber is arranged at a distance from said conveyor means sufficient for the surface of the cut pieces to dry before contacting said conveyor means.

* * * * *